(12) United States Patent  (10) Patent No.: US 7,896,653 B2
Nylen  (45) Date of Patent: Mar. 1, 2011

(54) OPHTHALMOLOGIC SURGERY SIMULATION DEVICE

(76) Inventor: Erik L. Nylen, West Des Moines, IA (US)

( * ) Notice: Subject to any disclaimer, the term of this patent is extended or adjusted under 35 U.S.C. 154(b) by 609 days.

(21) Appl. No.: 11/928,472

(22) Filed: Oct. 30, 2007

(65) Prior Publication Data

US 2009/0111081 A1  Apr. 30, 2009

(51) Int. Cl.
G09B 23/28 (2006.01)
(52) U.S. Cl. .................................... 434/271
(58) Field of Classification Search ............... 434/262, 434/265, 267, 270, 271, 295, 296; 351/203, 351/205; 446/341, 343–345
See application file for complete search history.

(56) References Cited

U.S. PATENT DOCUMENTS

| | | | | |
|---|---|---|---|---|
| 3,905,130 A * | 9/1975 | Gordon et al. | ............... | 434/271 |
| 4,762,495 A | 8/1988 | Maloney | | |
| 4,802,857 A * | 2/1989 | Laughlin | ..................... | 434/265 |
| 5,090,910 A * | 2/1992 | Narlo | ........................... | 434/82 |
| 5,137,459 A * | 8/1992 | Zirm | ........................... | 434/271 |
| 5,330,514 A * | 7/1994 | Egelandsdal et al. | ........ | 434/265 |
| 5,868,580 A * | 2/1999 | Amrein et al. | .............. | 434/271 |
| 5,893,719 A * | 4/1999 | Radow | ........................ | 434/271 |
| 6,485,142 B1 * | 11/2002 | Sheehy et al. | ............... | 351/203 |
| 6,500,009 B1 * | 12/2002 | Brault et al. | ................ | 434/265 |
| 6,589,057 B1 | 7/2003 | Keenan | | |
| 7,066,598 B2 * | 6/2006 | Niven | ......................... | 351/205 |
| 7,291,016 B2 * | 11/2007 | Otto | ........................... | 434/271 |

* cited by examiner

*Primary Examiner*—Kurt Fernstrom
(74) *Attorney, Agent, or Firm*—McKee, Voorhees & Sease, P.L.C.

(57) ABSTRACT

An ophthalmologic surgery simulation device is provided for realistic practice and training of ophthalmologic surgical procedures and techniques. The device includes a base, a stand extending upwardly from the base, a cup pivotally mounted on the stand, and a facial mask. A practice eye is retained in the cup by suction. The position of the cup relative to the eye sockets in the mask is adjustable, in a preferred embodiment. The cup and the eye are pivotal about at least two axes during surgical practice. The device can also be used for practicing other procedures on the eye.

15 Claims, 10 Drawing Sheets

OPHTHALMOLOGIC SURGERY SIMULATION DEVICE

FIELD OF THE INVENTION

The present invention is directed towards a device for practicing ophthalmologic surgery in a manner which simulates an operating room environment.

BACKGROUND OF THE INVENTION

Ophthalmologic procedures, including surgeries, are increasing in demand due to the growing population of people in need of such procedures, such as cataract surgeries. The training of medical students and resident physicians is critical to meet the demand, and to provide safe and successful procedures on their patients. Currently, medical students and resident physicians specializing in ophthalmology practice surgical techniques on systems that do not closely reflect the real operating room environment. For example, one training technique utilizes an animal eye, such as from a pig, which is pinned to a board in a fixed position so that the student or resident can practice a surgical technique. However, this prior art practice is unrealistic, in that the eye is fixed, as compared to a patient's eye which moves within the eye socket and is not held in a fixed position during surgery.

Prior art devices have also been developed for specific, narrow training purposes. For example, U.S. Pat. No. 6,589,057 discloses a device for supporting a simulated cornea for surgical training. U.S. Pat. No. 4,762,495 discloses a device for practicing removal of cataractous lenses. While the devices of these prior art patents allow medical students and resident physicians to perfect specific ophthalmologic surgery procedures, these practice devices are not realistic since the corneal lenses vary and are fixed against movement. Also, some prior art devices do not include other facial features that the ophthalmologist encounters in the real operating room. Furthermore, training of experienced ophthalmologists in the use of new technology and machines for manipulating and operating on an eye generally do not take into account the human face, and therefore do not consider collateral problems which may occur outside of the eye, itself. Thus, at least some of the learning curve for ophthalmology surgeons takes place in the live operating room, and potentially places patients at risk, in view of unrealistic practice and training techniques.

Therefore, a primary objective of the present invention is the provision of an improved ophthalmologic surgery simulation device.

Another objective of the present invention is the provision of a device for holding an eye in a realistic manner and setting for surgical procedure training.

Still another objective of the present invention is the provision of a device for ophthalmologic surgery simulation which supports an animal eye for pivotal movement within a facial mask.

Yet another objective of the present invention is the provision of a device for ophthalmologic surgery simulation which adjustably supports an eye for selective positioning within an eye socket of a mask.

Another objective of the present invention is the provision of a device which holds an eyeball in a cup by suction for surgical training.

Still another objective of the present invention is the provision of a device for ophthalmologic surgical training which provides a realistic environment for the surgeon.

These and other objectives will become apparent from the following description of the invention.

BRIEF SUMMARY OF THE INVENTION

An ophthalmologic surgery simulation device is provided for training of medical students, optometry and orthoptic students, resident physicians, experienced ophthalmologists, in procedures and techniques relating to the eye, including surgery. The device includes a base, with a cup for holding an eye adjustably mounted on the base. A facial mask is mounted on the base and includes normal facial features, such as the forehead, nose, lips, cheeks and chin. The eye is secured to the cup by suction and is adjustably positioned within one of the eye sockets of the mask. The height of the cup and eyeball is adjustable. The cup and eyeball are also free to rotate about X, Y and Z axes, to simulate movement of a real human eye. A portion of the mask can be moved between a setup position for placing the eye in the cup and a use position for practicing surgical techniques.

In a second embodiment, a second cup for holding a second eye is provided for alignment with the second eye socket of the mask.

DETAILED DESCRIPTION OF THE PREFERRED EMBODIMENT

Figure 1:
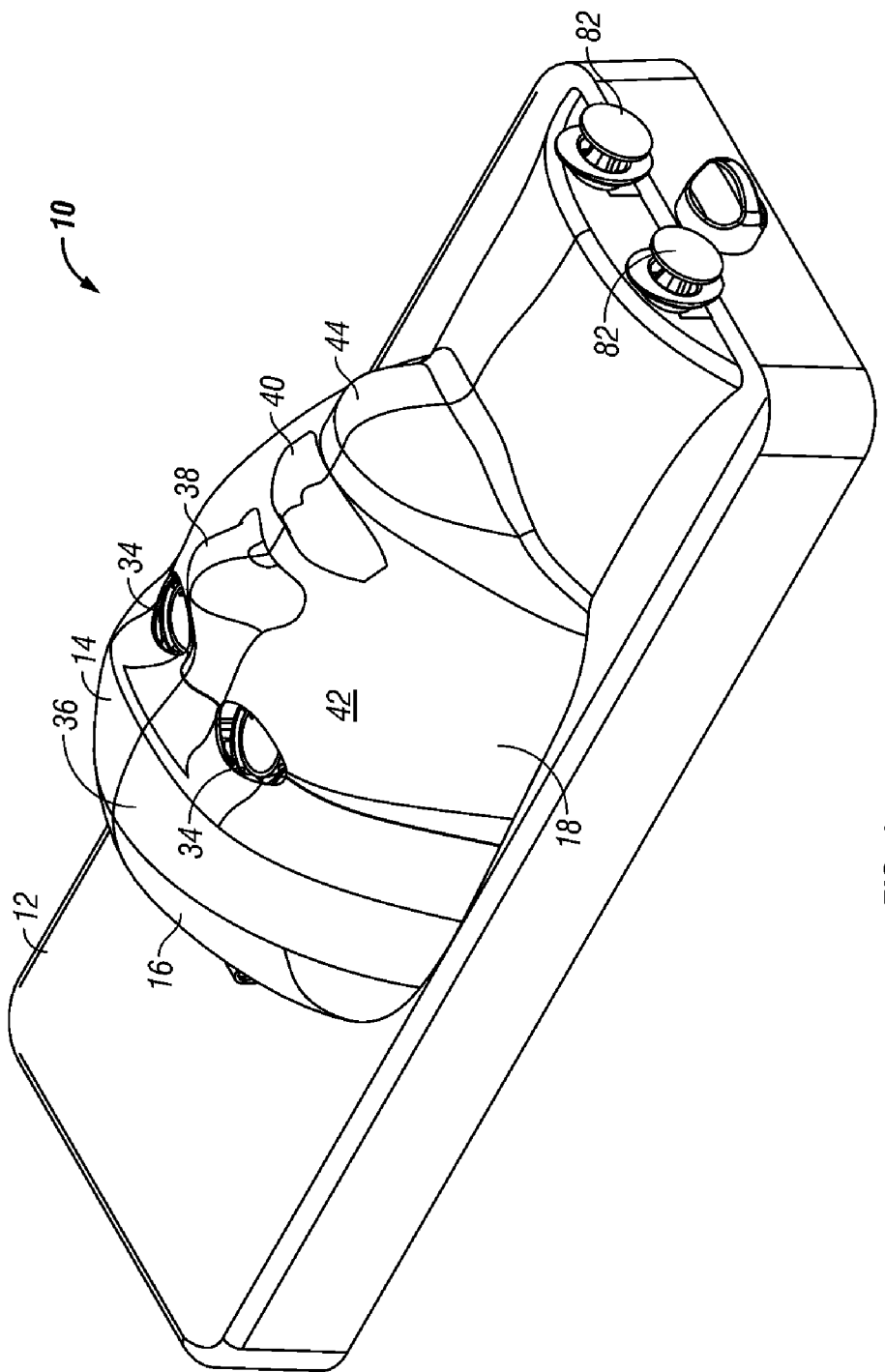
FIG. 1 is a perspective view of one embodiment of the ophthalmologic surgery training device of the present invention.
Figure 2:
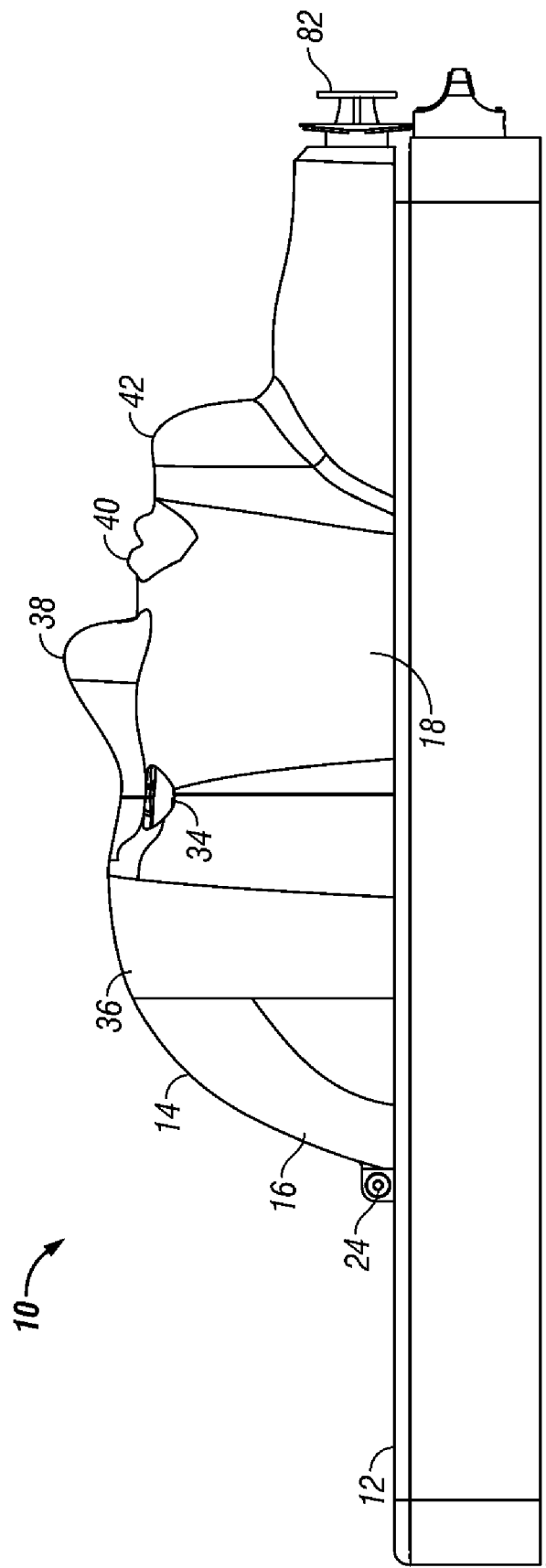
FIG. 2 is a side elevation view of the device shown in FIG. 1.
Figure 3:
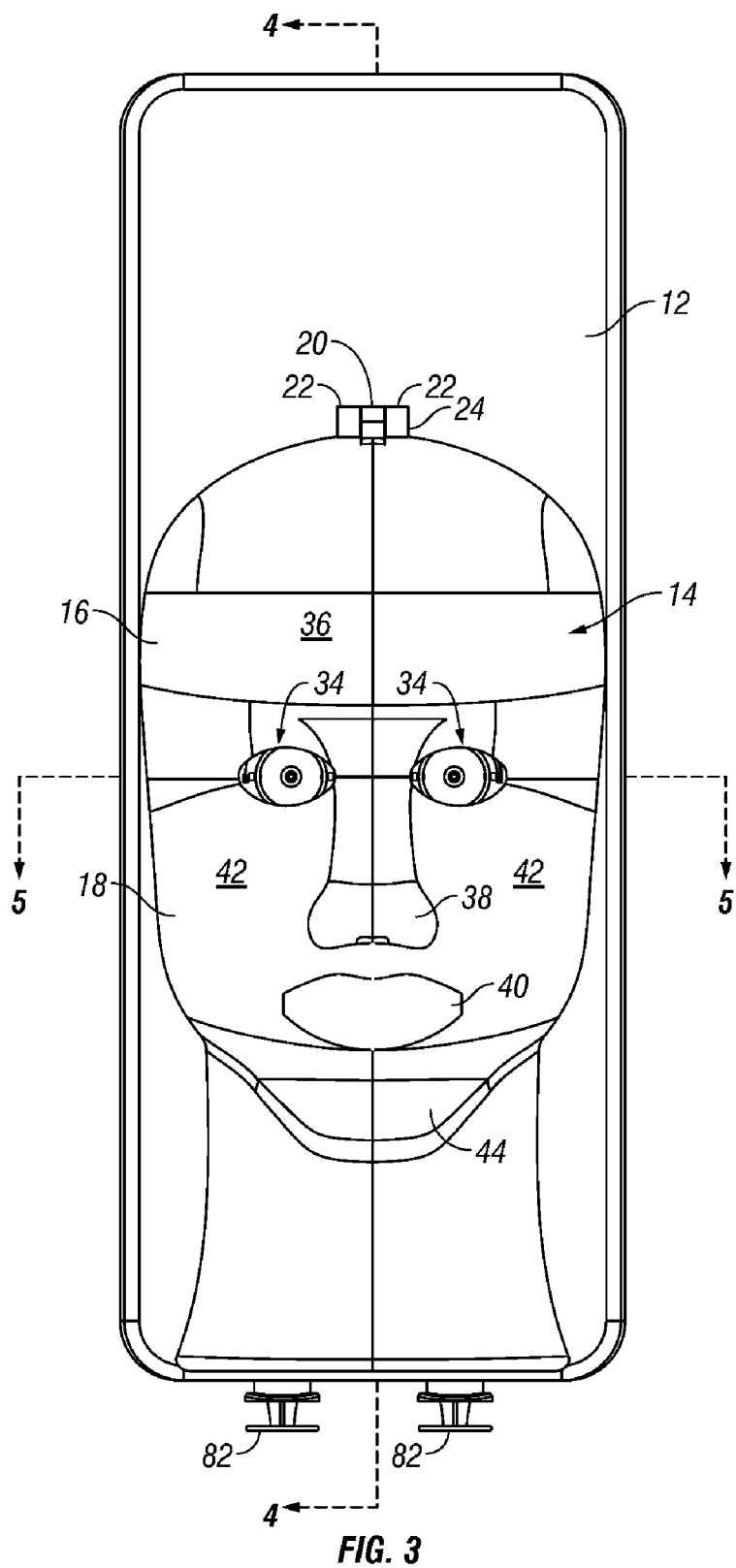
FIG. 3 is a top plan view of the device shown in FIG. 1.
Figure 4:
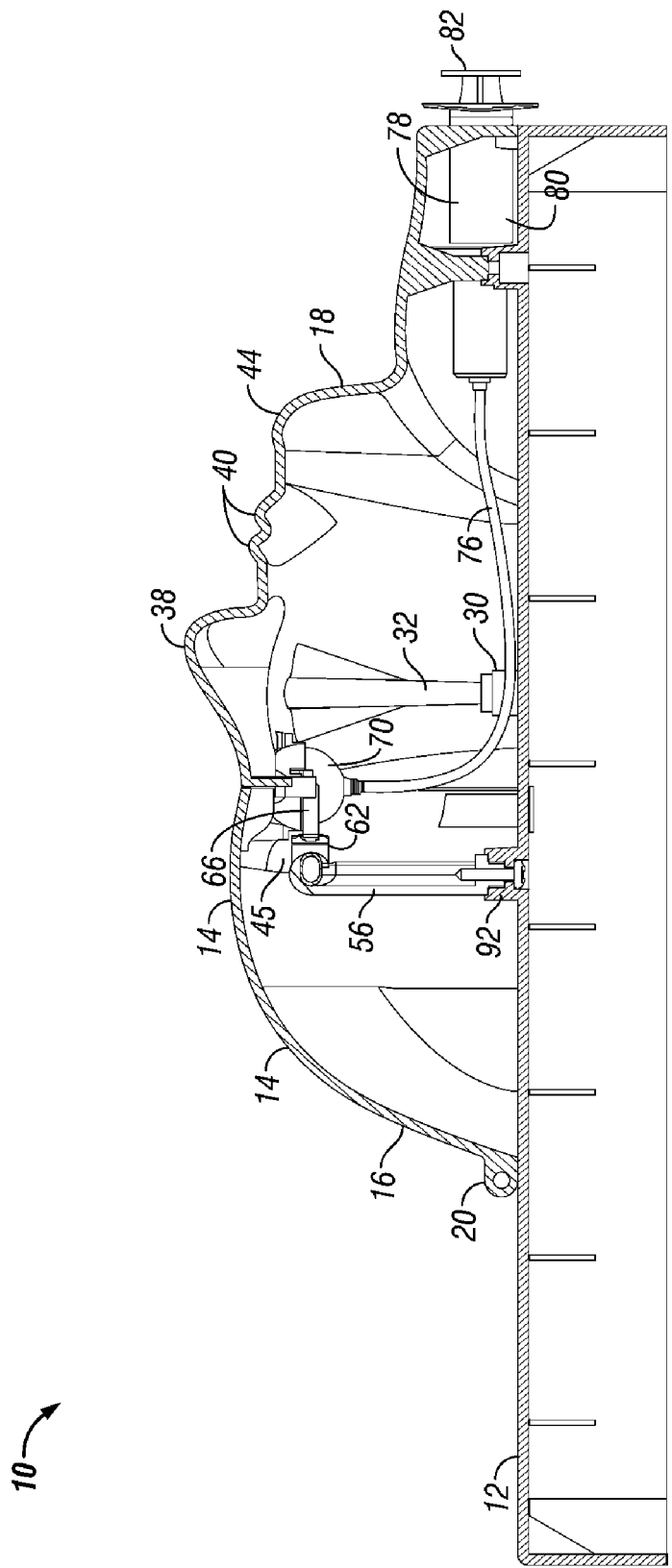
FIG. 4 is a side sectional view of the device taken along line 5-5 of FIG. 3.
Figure 5:
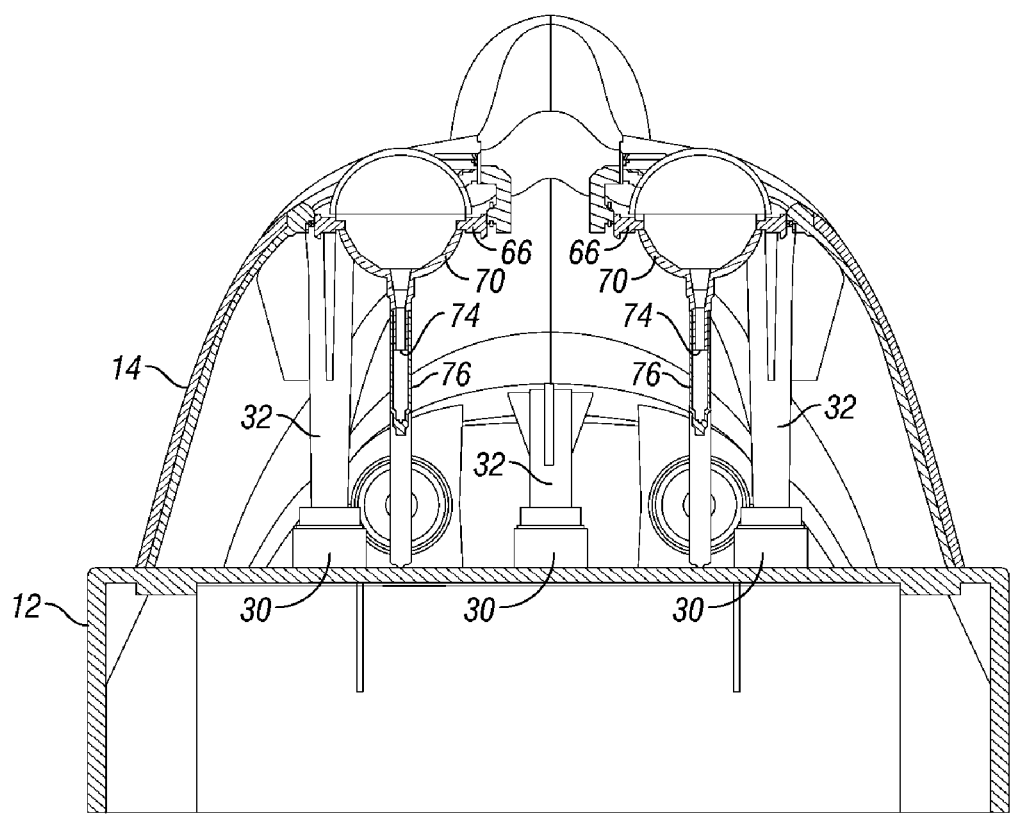
FIG. 5 is a sectional view taken along line 5-5 of FIG. 3.

The ophthalmologic surgery simulation device of the present invention is generally designated in the drawings by the reference numeral 10. The device 10 includes a base 12 to which a mask 14 is mounted. Preferably, the mask 14 includes separate upper and lower portions 16, 18, respectively. However, it is understood that the mask may be a single piece, or multiple pieces.

Figure 6:
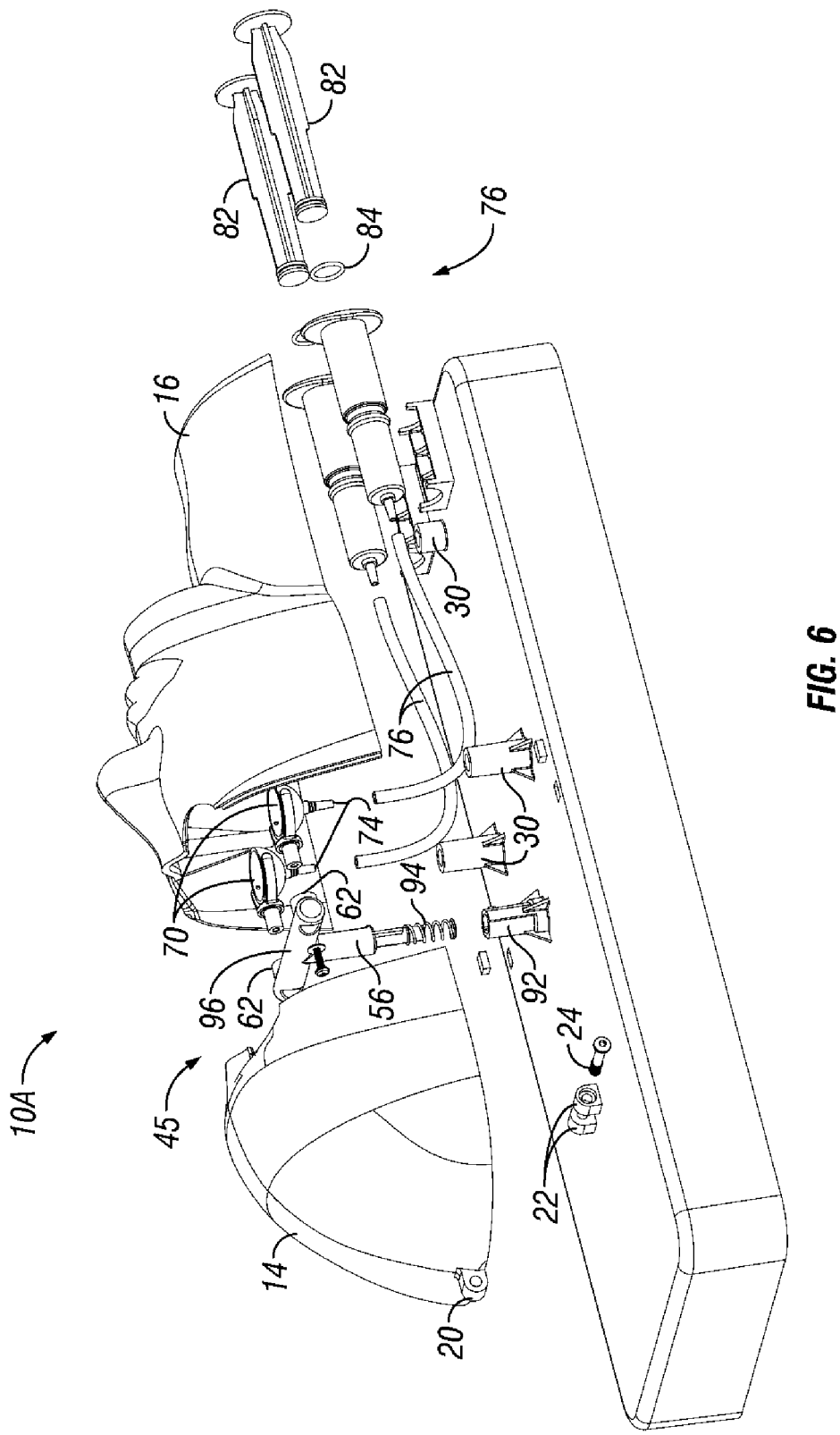
FIG. 6 is an exploded perspective view of the device of FIG. 1 with modified spring mounting of the socket stand.
Figure 7:
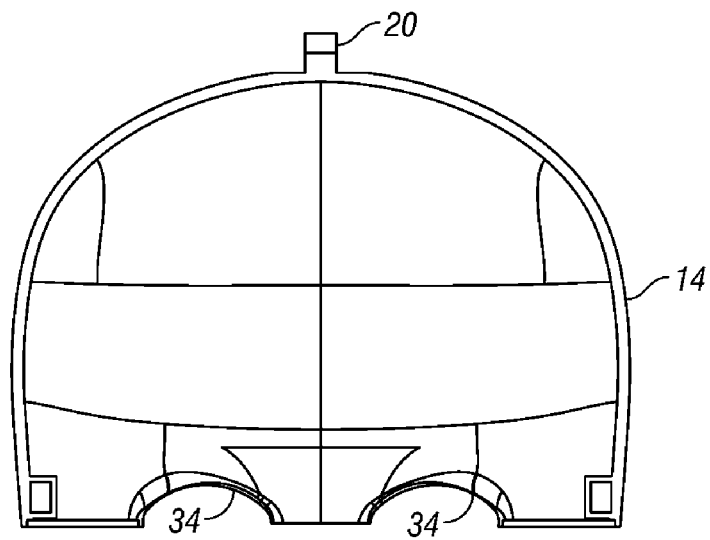
FIG. 7 is an elevation view showing the inside of the forehead portion of the mask.

In the preferred embodiment, the upper forehead portion 16 or the mask 14 is pivotally mounted on the base 12 via a hinge, such as a tab 20 at the top of the mask portion 16 received between a pair of ears 22 on the base 12 and secured by a pin 24. Thus, the upper mask portion 16 is pivotal at least 90°, and preferably approximately 120°, from a lowered use position to a raised setup position, as seen in FIG. 6. Preferably, the base 12 includes a pair of recesses 26 adjacent the opposite side edges, with magnets 28 frictionally fit within the recesses. The opposite edges of the upper mask portion 16 include small metal plates or metallic members so that the upper mask portion 16 can be releasably magnetically retained in the use position, yet pivoted upwardly about the pin 24 to the setup position.

Figure 8:
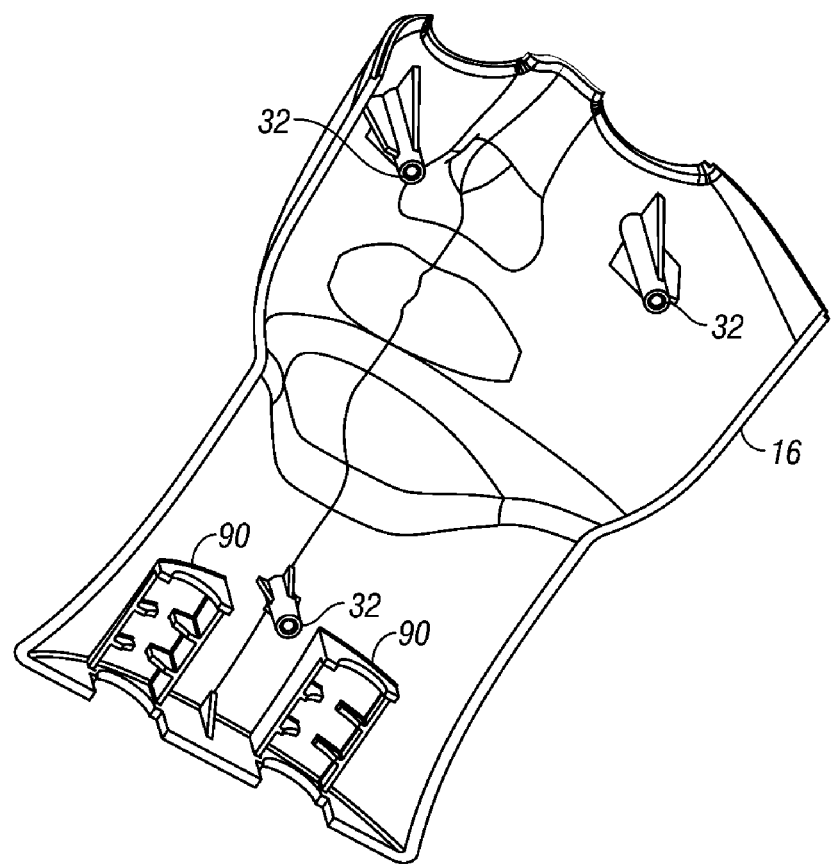
FIG. 8 is a perspective view showing the inside of the lower portion of the mask.

The base 12 includes one or more hollow bosses 30 adapted to frictionally receive pegs 32 molded or otherwise provided on the inside of the lower mask portion 18, as best seen in FIG. 8. Thus, the pegs 32 of the lower portion 18 can be releasably press fit into the bosses 30 of the base 12 to mount the lower portion 18 on the base 12.

The upper mask portion 16 and the lower mask portion 18 each have a pair of recesses 34 which define eye sockets when the upper portion 16 is in the use position and the lower portion 18 is mounted on the base 12. Overall, the mask 14 provides realistic facial features, including a forehead 36, nose 38, lips 40, cheeks 42, and a chin 44.

The device 10 includes an eye ball support stand 45 mounted on the base 12 inside the mask 14. The stand 45 can be fixed, spring biased, or adjustably mounted to the base 12 as described below. The stand 45 may support one or two eye balls.

Figure 11:
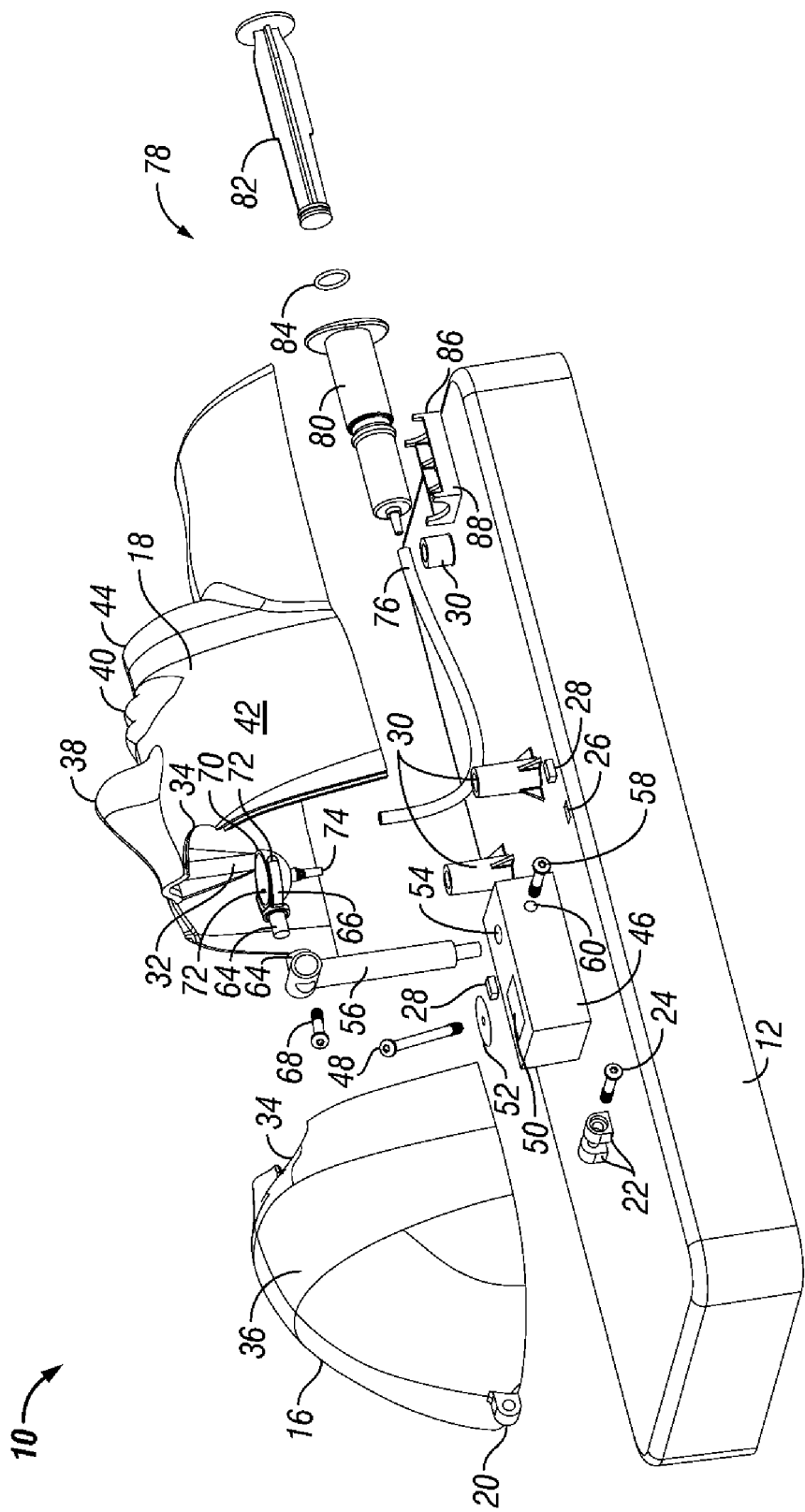
FIG. 11 is an exploded perspective view of an alternative embodiment of the invention with adjustable mounting of the socket stand.

In one embodiment shown in FIG. 11, a block or rudder 46 is adjustably mounted on the base 12 using a bolt or pin 48 extending through an enlarged opening 50 in the rudder 46 and threadably received in the base 12. A washer 52 allows the bolt 48 to be tightened so as to maintain the rudder 46 in a desired position on the base 12. The hole 50 allows the rudder to be moved laterally, longitudinally and laterally upon the base 12, and pivoted about the bolt 48.

The rudder 46 includes a vertical hole 54 adapted to receive the lower end of a leg 56 of the stand 45, so that the stand 45 is adjustably mounted on the base 12 via the rudder 46. A set screw 58 is threadably received within a horizontal hole 60 so as to allow for adjustable height of the leg 56 relative to the base 12 and rudder 46. The upper end of the leg 56 includes a horizontal arm 62 adapted to receive a stub 64 of a yoke 66. A screw or bolt 68 extends through the arm 62 and is threadably received in the stub 64 so as to retain the yoke 66 on the arm 62. The yoke 66 is pivotal about the axis of the stub 64.

FIG. 6 shows an alternative embodiment of a device 10A having two cups 70 and two syringe assemblies 78 so as to support a practice eye in each of the eye sockets 34. Also, in the device 10A, the rudder 46 is eliminated and the leg 56 is supported in a boss 92. A spring 94 is provided on the leg 56, so that the leg 56, yokes 66 and cups 70 float vertically. The upper end of the leg 56 includes a cross bar 96 to which the arms 62 are secured and spaced relation to one another.

Figure 9:
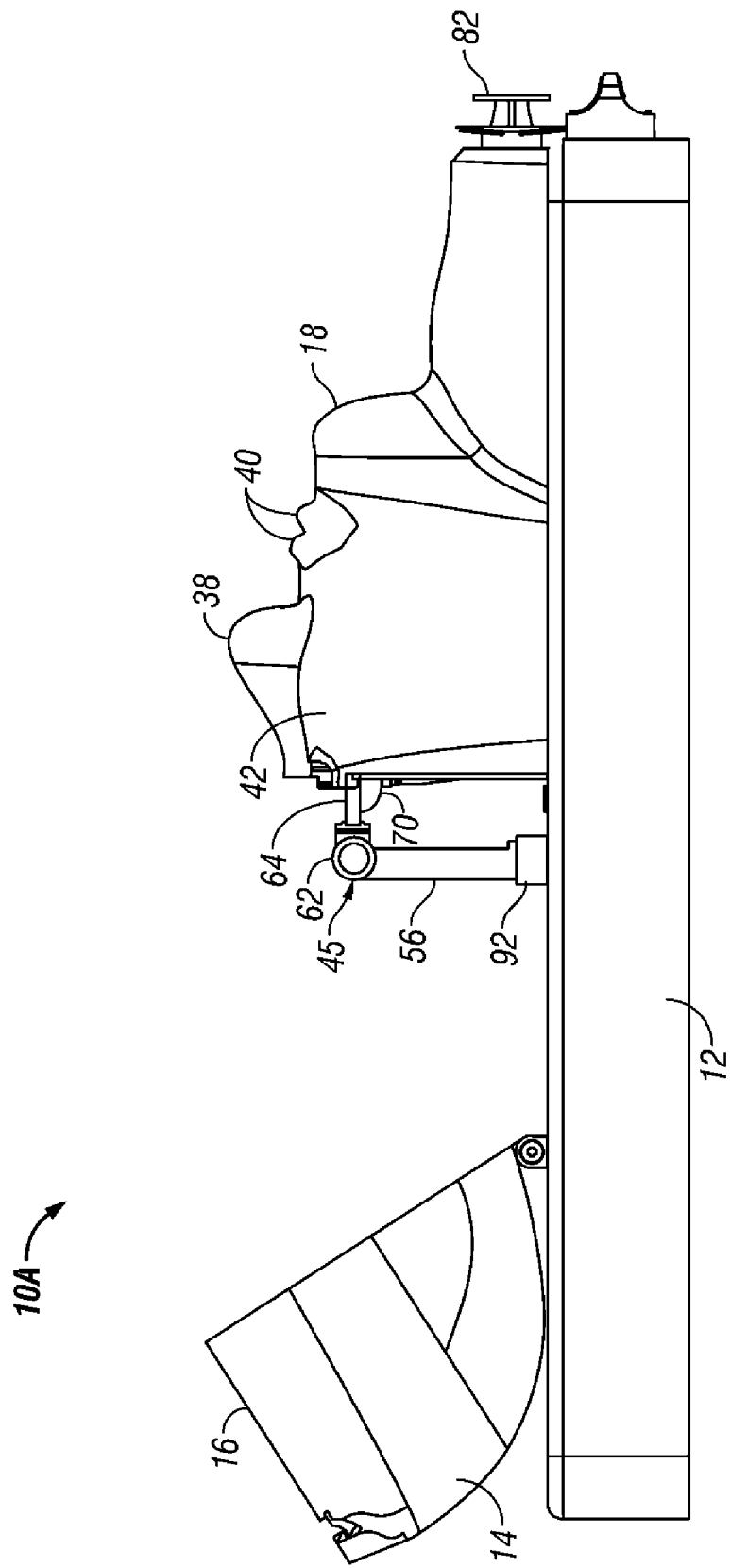
FIG. 9 is a side elevation view of the device with the forehead portion of the mask pivoted to the setup position.
Figure 10:
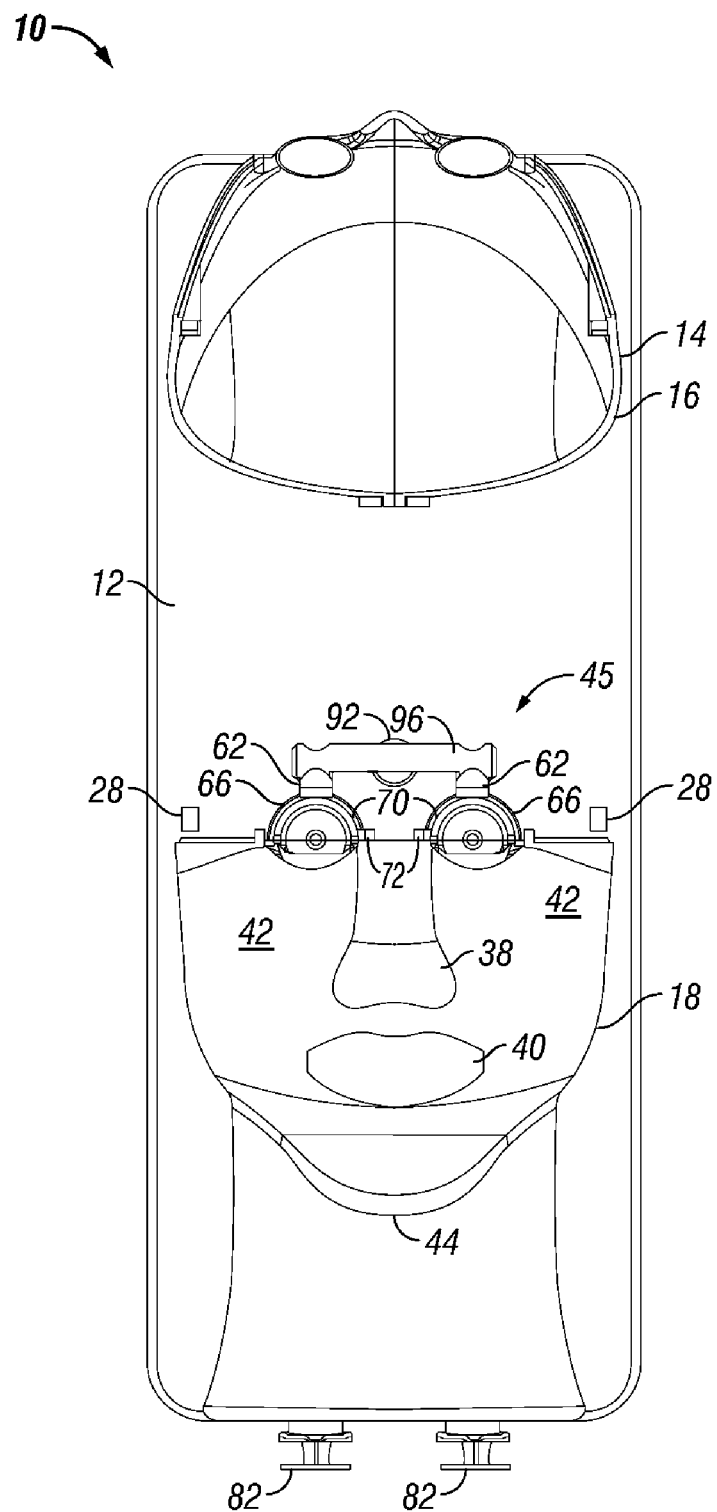
FIG. 10 is a top plan view of the device with the forehead portion of the mask pivoted to the setup position.

In yet another variation shown in FIG. 9, the support stand 45 is simply mounted in a fixed orientation to the base 12, with the leg 56 connected to the boss 92, without the spring 94.

Each yoke 66 pivotally supports cup, a dish or container 70 for holding an eye, with pins 72 at the opposite ends of the yoke 66. In the preferred embodiment, the cup 70 includes a downwardly extending tube 74 connected to a hose 76, which in turn, is connected to a vacuum source, such as a syringe assembly 78, for holding the eye in the cup 70 by suction. The syringe assembly 78 includes a body 80, a plunger 82, and an O-ring seal 84. The syringe assembly 78 is clamped in a carrier or holder 86 on the base 12 and/or on the lower mask portion 18. In one embodiment, the carrier 86 includes opposite halves 88, 90 formed on the base 12 and the lower mask portion 18, respectively.

In an alternative embodiment, the tube 74, hose 76 and syringe assembly 78 can be replaced with mechanical means (not shown) for retaining the eye in the cup 70. For example, a strap or clamp can be secured to the cup 70 and extend over the eye to hold the eye in position in the cup 70.

In use, the upper mask portion 16 is pivoted upwardly about the axis of the pin 24 to the setup position, which provides access to the cup(s) 70. In the embodiment shown in FIG. 11, the bolt 48 is loosened so as to allow the rudder to be adjustably positioned with the cup 70 under the left or right eye socket 34 of the lower mask portion 18. The bolt 48 is then tightened to maintain the cup 70 in the selected position. The height of the cup 70 relative to the eye socket 34 is also adjustable by loosening the set screw 58 and raising or lowering the leg 56 in the hole 54 of the rudder 46. The set screw 58 is then tightened to maintain the selected height of the cup 70. An eye, such as an animal eye or other artificial eye is placed in the cup 70. The upper mask portion 16 is then pivoted downwardly to the use position. The syringe plunger 82 is then withdrawn partially from the syringe body 80 so as to apply a vacuum through the hose 76 and tube 72, and thereby hold the eye in the cup 70.

The device 10 is then ready for a student or physician to practice a procedure on the eye. Since the cup 70 is pivotal about the X and Y axes defined by the screw 68 and pins 72, the device 10 simulates an operating room environment wherein a patient's eye is not fixed in a set position in the eye socket of his/her face. The cup 70 is also pivotal about the Z axis defined by the longitudinal axis of the leg 56, if the set screw 58 is not tightened, for the embodiment shown in FIG. 11, or for the embodiment shown in FIG. 6.

Thus, the device 10 provides a realistic simulation of the actual conditions and environment that ophthalmologists and other trained personnel will have during patient eye surgery and other eye procedures. Accordingly, the device 10 affords realistic practice and training for procedures on the eye.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A device for practicing opthalmologic surgery on an eye, comprising:
    a base;
    a cup for holding an eye, and being mounted to the base;
    a suction tube connected to the cup to retain the eye in the cup;
    a leg extending upwardly from the base, and an arm extending from an upper end of the leg, and the cup being pivotally mounted to the arm for pivotal movement about a first axis; and
    a yoke connected to the arm and supporting the cup for pivotal movement about a second axis.

2. The device of claim 1 wherein the cup is pivotal about at least one axis.

3. The device of claim 1 wherein the cup is adjustably mounted to the base.

4. The device of claim 1 further comprising a syringe connected to the tube to apply suction to the eye in the cup.

5. The device of claim 1 further comprising a mask mounted to the base to simulate a human face, including eye sockets behind which the eye in the cup can be positioned.

6. The device of claim 4 wherein the base includes separate upper and lower portions.

7. The device of claim 5 wherein the upper portion of the base is pivotally mounted to the base for movement between raised and lowered positions.

8. The device of claim 1 further comprising a second cup mounted to the base for holding a second eye.

9. An opthalmologic surgery simulation device for practicing opthalmologic surgery on an eye, comprising:
   a base;
   a cup pivotally mounted on the base for holding an eye
   a leg extending upwardly from the base, an arm extending from the leg, and the cup being pivotally mounted to the arm for pivotal movement about a first axis; and
   a yoke connected to the arm and supporting the cup for pivotal movement about a second axis.

10. The device of claim 9 further comprising a suction tube extending between the cup and a vacuum source to apply a vacuum to an eye in the cup and thereby retain the eye in the cup.

11. The device of claim 9 further comprising a mask mounted to the base to simulate a human face, including eye sockets behind which the eye in the cup can be positioned.

12. The device of claim 11 wherein the mask includes a portion pivotally mounted to the base for movement between use and set up positions.

13. The device of claim 9 wherein the cup is pivotal about three axes.

14. The device of claim 9 wherein the cup has an adjustable height.

15. The device of claim 9 wherein the cup is adjustably mounted on the base for longitudinal and lateral positioning.

* * * * *